United States Patent Office 2,999,073
Patented Sept. 5, 1961

2,999,073
SYNTHESIS OF ACRYLONITRILE
Charles R. Harris, Lockport, N.Y., assignor to E. I. du Pont de Nemours and Company, Wilmington, Del., a corporation of Delaware
No Drawing. Filed Nov. 8, 1957, Ser. No. 695,193
3 Claims. (Cl. 252—429)

This invention relates to the production of acrylonitrile by the reaction of hydrogen cyanide and acetylene in a nonaqueous liquid catalyst.

A common process for making acrylonitrile involves passing hydrogen cyanide and acetylene into an aqueous dispersion of cuprous chloride solubilized by having present therein a considerable amount of alkali metal halide or ammonium chloride or mixtures of these. An undesirable feature of these aqueous catalyst systems is the production of excessive amounts of acetaldehyde, lactonitrile and tars of an ill-defined and probably variable composition. These by-products not only represent irretrievable loss of raw material, but also make the purification of the acrylonitrile, as well as the recovery of the cuprous chloride catalyst, difficult and costly.

Nonaqueous catalyst media containing cuprous chloride have been suggested, but in most cases the rate of conversion of the raw materials to acrylonitrile has not been as high as desired. And, although some by-products, such as acetaldehyde and lactonitrile, are not produced in these systems, the formation of tars is still a problem.

It is, accordingly, a major object of this invention to provide an improved nonaqueous catalyst system for the production of acrylonitrile. It is also an object to provide a catalyst mixture which will have an improved productivity per unit of catalyst. It is also an object to provide a catalyst from which the product can be easily recovered.

I have found that these and other objects can be accomplished by passing hydrogen cyanide and acetylene into a catalyst mixture comprising cuprous chloride dissolved in a stable solvent, preferably an organic nitrile such as benzonitrile and activating said mixture by the addition of a cyclic amide such as α-pyrrolidone, together with hydrogen chloride.

The solvent for cuprous chloride may be a mono or poly nitrile and it may be aliphatic or aromatic or a mixture thereof with the requirement that the solvent will dissolve preferably at least 30% by weight of the solution of cuprous chloride and preferably 35 to 50% or more. And this solvent action preferably should be such that no "solubilizer" such as ammonium halide or alkali metal halide is required. Particularly no inorganic solubilizer should be necessary.

The activator or promoter need not be a solvent for cuprous chloride, indeed cuprous chloride may be completely insoluble therein; but the activator must possess the unique property of materially increasing the catalytic activity of the cuprous chloride catalyst in the anhydrous system.

In practicing this invention, a solution is prepared which contains cuprous chloride, the nitrile solvent and the lactam promoter. Dry acetylene and hydrogen cyanide are fed into this catalyst liquid system contained in a suitable reactor with the acetylene in excess of that required for reacting with the hydrogen cyanide. In order to operate the catalyst for long periods of time, it is preferable to feed some dry hydrogen chloride into the catalyst solution to avoid the build-up of excessive amounts of cyanide, specifically cuprous cyanide, within the catalyst. The off-gas from the reactor contains acrylonitrile which can be isolated by well-known means which are not a part of the present invention.

The following examples will illustrate the principles underlying the present invention, but they are not to be considered as limiting the scope thereof.

Example 1

A catalyst solution was prepared which contained 35% cuprous chloride, 50% benzonitrile, and 15% α-pyrrolidone. The catalyst solution was maintained at 130° C. Acetylene and hydrogen cyanide were fed to the catalyst in a mole ratio of 15:1. The total gas flow was adjusted so that about 5% of the hydrogen cyanide came through the catalyst unreacted. The total amount of acrylonitrile in the reactor off-gas gradually increased until, after 30 hours, the catalyst was producing 100 g. of acrylonitrile/hr./kg. of copper in service. The catalyst productivity remained at a high level. After 180 hours of continuous operation, the productivity had declined by only 20–25%. The yields, based on the consumption of hydrogen cyanide and acetylene, were 90–95% and 85–90%, respectively. Throughout the experiment anhydrous hydrogen chloride was fed to the catalyst in an amount equal to 6% by weight of the hydrogen cyanide to prevent the build-up of cyanide in the catalyst. A catalyst containing 35% cuprous chloride in benzonitrile with no α-pyrrolidone has a productivity at 130° C. of only 28 g. acrylonitrile/hr./kg. of copper in service.

Example 2

A catalyst was prepared containing 44% cuprous chloride, 43% benzonitrile, 11% α-pyrrolidone, and 2% anhydrous hydrogen chloride. The catalyst was operated at 100° C. The hydrogen chloride feed to the catalyst was 10% by weight of the hydrogen cyanide feed. The acetylene and hydrogen cyanide feeds were adjusted as in Example 1. The catalyst activity reached a peak after 30 hours of operation. This maximum productivity was 110 g. acrylonitrile/hr./kg. of copper in service. The catalyst was operated for a total of 300 hours. At this time the productivity was still over 60% of the peak productivity reached after 30 hours of operation. The yield of the reaction based on consumption of hydrogen cyanide was 95%. The amounts of volatile acetylenic by-products and the amount of tar formed in the catalyst were very low. The yield based on acetylene converted to acrylonitrile was 85–90%. Most of the other 10–15% of the acetylene formed volatile by-products so that the formation of tars in the catalyst was very small.

A 44% solution of cuprous chloride in benzonitrile with no pyrrolidone has a productivity at 100° C. of only 12–15 g. acrylonitrile/hr./kg. of copper in service.

Example 3

A catalyst was prepared which contained 39% cuprous chloride, 44% adiponitrile, 12% α-pyrrolidone and 5% anhydrous hydrogen chloride (this is equivalent to 17% of pyrrolidone hydrochloride). The catalyst was operated at 100° C. The feeds of acetylene, hydrogen cyanide and anhydrous hydrogen chloride were adjusted as in Example 2. The productivity of the catalyst reached 60 g. acrylonitrile/hr./kg. of copper. Once again the formation of volatile by-products, monovinylacetylene and vinyl chloride was low. The rate of formation of tar within the catalyst was less than 1 g. for each 100 g. of acrylonitrile produced. As in the previous examples, the yield of the reaction based on the consumption of hydrogen cyanide was at least 95%. With no pyrrolidone, a 39% solution of cuprous chloride in adiponitrile at 100° C. has a productivity of about 5 g. acrylonitrile/hr./kg. of copper in service.

While the reaction can be conducted at a temperature as low as about 70° C. and as high as 150° C. or as high as the boiling point of the catalyst mixture, it is generally preferred to use a temperature between about 90° and 140° C. The temperature range may be increased by operating under pressures above atmospheric. As the pressure is increased, the productivity of the catalyst increases linearly, but the pressure used must be consistent with safe operation.

It is advantageous to use the highest concentration of cuprous chloride possible in the catalyst mixture. The upper limit on the concentration of cuprous chloride depends on the nitrile solvent used and upon the temperature of operation. Catalyst productivity increases as the cuprous chloride concentration increases. Accordingly, a cuprous chloride concentration up to at least 50% by weight of the catalyst mixture is desirable and, where feasible, concentrations up to about 65% are even more desirable. The cuprous chloride should preferably be present in solution since undissolved cuprous chloride is not an effective catalyst for the reaction.

The amount of nitrile solvent used to dissolve the cuprous chloride will need to be sufficient to make a concentrated solution. The amount of nitrile solvent used will, in general, be of the order of the cuprous chloride present and it, together with the chloride, will constitute the major portion by weight of the catalyst solution. The solvent will vary with its specific solvent property and the temperature, but in general it will constitute between about 30% to 60% by weight of the catalyst mixture.

The promoter or activator to be used in the catalyst system will generally constitute a minor proportion approximately of the order of 2 to 30% by weight of the catalyst mixture. The preferred proportion will lie between about 5% to 20% by weight of the catalyst liquid system as a whole.

For long catalyst life, it is necessary to add hydrogen chloride to the catalyst mixture. This is preferably added continuously as the reactants are fed to the catalyst. The amount of hydrogen chloride fed may vary over a wide range which will lie between about 1% to 20% by weight of the hydrogen cyanide feed depending upon other conditions of operation. Indeed, if desired, the hydrogen chloride may be added intermittently, although, generally more uniform operation will be possible if continuous addition is practiced. The concentration of hydrogen chloride in the catalyst will be between about 0.01 and 10% by weight and will preferably be between about 0.1 and 5.0%.

Organic nitriles suitable for dissolving cuprous chloride must be relatively stable under the conditions of reaction. A wide variety of nitriles may be used in addition to benzonitrile and adiponitrile. Phenylacetonitrile, butyronitriles, succinonitrile, o-tolunitrile, glutaronitrile, β-chloropropionitrile, the phthalonitriles and many others are sutable solvent media, singly or in combinations. In general, aliphatic and aromatic nitriles may be used provided they boil at or above the boiling point of acrylonitrile, but preferably above about 100° C. at atmospheric pressure. Such solvents may contain one or more nitrile groups, but they must, of course, be thermally stable under the conditions of reaction. Nitriles comprising both alkyl and aryl groups may be used provided they meet the above requirements, particularly as to cuprous chloride solubility and stability under conditions of use.

A wide variety of cyclic amide type of promoters may be used with the nitrile solution of the cuprous chloride. Specifically useful are α-pyrrolidone, α-piperidone, α-caprolactam and cyclic amides generally. The lactams or cyclic amides may have substituents such as nitro, halogen, alkyl, aryl, aralkyl or alkaryl groups attached to a carbon atom in the ring such as 5-methyl-2-pyrrolidone. Likewise, N-substituted lactams may be used effectively. Such alkyl on either carbon or nitrogen may contain substituents of one to eight carbon atoms. Other substituents will contain not over 12 carbon atoms. The hydrohalides, preferably the hydrochlorides of these lactams or cyclic amides, such as pyrrolidone hydrochloride, are especially effective promoters of the anhydrous cuprous chloride catalyst system. Lactams or cyclic amides have the general formula

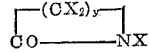

wherein X is either hydrogen or a substituent such as alkyl, aryl, aralkyl or alkaryl and y is usually a number between 3 and 6 inclusive. Within the class of cyclic amide promoters are included the hydantoins and substituted hydrantoins, such as glycolylurea, dimethylhydantoin, methyl ethyl hydantoin and others, provided only that they are thermally stable under reacting conditions in the catalyst system. It is also essential that the promoter boil at a temperature above the temperature at which the catalyst is operated and that such boiling point be at least 100° C. at atmospheric pressures.

In general, a promoter is a cyclic amide of the type described above which will increase the activity of the catalyst at least 50% over that in the system containing only the nitrile solvent for cuprous chloride.

The ratio of acetylene to the hydrogen cyanide in the feed gas passed into the catalyst may be varied widely. Ratios of $C_2H_2$ to HCN of 25:1 to 2:1 are suitable. At higher ratios the recycling of excess acetylene becomes prohibitively expensive. At lower ratios the acrylonitrile is not swept out of the catalyst efficiently. The preferred ratio is 15:1 to 6:1.

I claim:
1. A liquid anhydrous catalyst comprising, by weight, 30 to 50% cuprous chloride, 30 to 60% liquid organic nitrile having a boiling point at atmospheric pressure above 100° C. and stable at 70° to 150° C. as the essential component for dissolving the cuprous chloride without addition of salt solubilizer for the cuprous chloride, and 2 to 30% of a promoter having the general formula

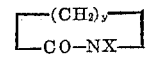

wherein X represents a substituent selected from the group consisting of hydrogen and methyl and y is a number from 3 to 6.

2. A liquid anhydrous catalyst comprising, by weight, 30 to 50% cuprous chloride, 30 to 60% of an organic nitrile solvent selected from the group consisting of benzonitrile and adiponitrile, and 2 to 30% of a promoter having the general formula

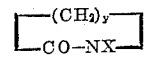

wherein X represents a substituent selected from the group consisting of hydrogen and methyl and y is a number from 3 to 6.

3. A liquid anhydrous catalyst comprising, by weight, 30 to 50% cuprous chloride, 30 to 60% adiponitrile and 2 to 30% α-pyrrolidone.

References Cited in the file of this patent

UNITED STATES PATENTS

| | | |
|---|---|---|
| 2,385,741 | Teter | Sept. 25, 1945 |
| 2,411,483 | Wochter et al. | Nov. 19, 1946 |
| 2,419,186 | Harris et al. | Apr. 15, 1947 |
| 2,440,498 | Young et al. | Apr. 27, 1948 |
| 2,441,214 | Thomas et al. | May 11, 1948 |
| 2,503,264 | Pampton | Apr. 11, 1950 |
| 2,688,034 | Stehman | Aug. 31, 1954 |
| 2,798,884 | Christopher | July 9, 1957 |
| 2,920,098 | Burrus et al. | Jan. 5, 1960 |